United States Patent
Solanki et al.

(10) Patent No.: US 8,607,161 B2
(45) Date of Patent: Dec. 10, 2013

(54) CONFIGURABLE ICON SIZING AND PLACEMENT FOR WIRELESS AND OTHER DEVICES

(75) Inventors: Jaisingh Solanki, Toronto (CA); Greg Fields, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 568 days.

(21) Appl. No.: 12/392,154

(22) Filed: Feb. 25, 2009

(65) Prior Publication Data

US 2009/0282352 A1    Nov. 12, 2009

Related U.S. Application Data

(60) Provisional application No. 61/052,020, filed on May 9, 2008.

(51) Int. Cl.
*G06F 3/048* (2013.01)
(52) U.S. Cl.
USPC .......................................... 715/815; 715/800
(58) Field of Classification Search
USPC .................................. 715/815, 800
See application file for complete search history.

(56) References Cited

U.S. PATENT DOCUMENTS

| | | | |
|---|---|---|---|
| 5,548,692 | A | 8/1996 | Cok |
| 7,216,304 | B1 | 5/2007 | Gourdol et al. |
| 7,458,036 | B2 | 11/2008 | Amano |
| 8,245,143 | B2 * | 8/2012 | Yach et al. ............... 715/744 |
| 2003/0045315 | A1 | 3/2003 | Vasa |
| 2005/0119031 | A1 * | 6/2005 | Spalink et al. ............. 455/566 |
| 2005/0251758 | A1 | 11/2005 | Cummins et al. |
| 2006/0020899 | A1 * | 1/2006 | Gusmorino et al. ........ 715/765 |
| 2006/0250378 | A1 * | 11/2006 | Fabre et al. .............. 345/173 |
| 2007/0082707 | A1 | 4/2007 | Flynt et al. |
| 2007/0101286 | A1 | 5/2007 | Minami et al. |
| 2007/0174782 | A1 * | 7/2007 | Russo ....................... 715/781 |
| 2007/0209022 | A1 | 9/2007 | Gourdol et al. |
| 2008/0074384 | A1 | 3/2008 | Orr et al. |
| 2008/0184112 | A1 | 7/2008 | Chiang et al. |
| 2008/0309511 | A1 | 12/2008 | Kerr et al. |

FOREIGN PATENT DOCUMENTS

| | | |
|---|---|---|
| EP | 1 174 787 A2 | 1/2002 |
| GB | 2 446 651 A | 8/2008 |

OTHER PUBLICATIONS

Microsoft, Microsoft Windows XP, 2002, Screen shots from working program, p. 1-3.*
Extended European Search Report for EP 09153553.4, Jan. 26, 2010.
"Change Desktop Icon Size Windows XP"; http://www.entity.cc/change-icon-size.php; downloaded Nov. 12, 2008 (1 sheet).
"Sizing Icons"; http://doc.hp.com/en/B1171-90146/ch05s05.html; downloaded Nov. 12, 2008 (1 sheet).

(Continued)

*Primary Examiner* — David Phantana Angkool
(74) *Attorney, Agent, or Firm* — McCarthy Tétrault LLP

(57) ABSTRACT

A method for displaying icons of a graphical user interface on a display screen of a device (e.g., a wireless or other device), comprising: receiving a signal indicating a selected number of the icons to be displayed; comparing the selected number to a current number of the icons to be displayed; changing a size of an underlay for at least one of the icons if the selected number is not equal to the current number; and, displaying icons corresponding to the selected number on the display screen.

20 Claims, 10 Drawing Sheets

(56) References Cited

OTHER PUBLICATIONS

"Placing Icons"; http://doc.hp.com/en/B1171-90146/ch05s06.html; downloaded Nov. 12, 2008 (3 sheets).

"Advanced Icon Editing of Windows Icons"; http://entity.cc/advanced-icon-editing.php; downloaded Nov. 12, 2008 (2 sheets).

"UIGraphics: Specifications: Iconsize"; http://wiki.eclipse.org/UIGraphics_:_Specifications_:_IconSize&Placement; downloaded Nov. 12, 2008 (11 sheets).

* cited by examiner

US 8,607,161 B2

CONFIGURABLE ICON SIZING AND PLACEMENT FOR WIRELESS AND OTHER DEVICES

This application claims priority from U.S. Provisional Patent Application No. 61/052,020, filed May 9, 2008, and incorporated herein by reference.

FIELD OF THE APPLICATION

This application relates to the field of graphical user interfaces, and more specifically, to a method and system for configuring icon sizing and placement for graphical user interfaces of wireless and other devices.

BACKGROUND

Current wireless mobile communication devices include microprocessors, memory, soundcards, speakers, headphones, and run one or more software applications in addition to providing for voice communications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. Such wireless devices may operate on a cellular network, on a wireless local area network ("WLAN"), or on both of these types of networks. Wireless device applications are typically initiated and controlled by way of a graphical user interface ("GUI") which is displayed on the display screens of such devices.

One problem with current wireless devices pertains to the limited size of the display screens of these devices. In particular, users having impaired vision often find it difficult to distinguish or select icons displayed on the display screen of such a device as part of the device's GUI. In addition, users having learning disabilities, memory loss, or cognitive impairments often find it difficult to associate icons displayed on the display screen with their intended function or meaning.

A need therefore exists for an improved method and system for displaying icons on the display screens of wireless and other devices.

BRIEF DESCRIPTION OF THE DRAWINGS

Features and advantages of the example embodiments disclosed herein will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain software, circuits, structures and techniques have not been described or shown in detail in order not to obscure the application. Example embodiments may be implemented in any computer programming language provided that the operating system of the device (e.g., wireless device, data processing system, etc.) provides the facilities that may support the requirements of the application. Any limitations presented would be a result of a particular type of operating system or computer programming language and would not be a limitation of the present application. Example embodiments of the present application may also be implemented in hardware or in a combination of hardware and software.

According to one example embodiment of the application, there is provided a method for displaying icons of a graphical user interface on a display screen of a device (e.g., a wireless or other device), comprising: receiving a signal indicating a selected number of the icons to be displayed; comparing the selected number to a current number of the icons to be displayed; changing a size of an underlay for at least one of the icons if the selected number is not equal to the current number; and, displaying icons corresponding to the selected number on the display screen.

Figure 1:
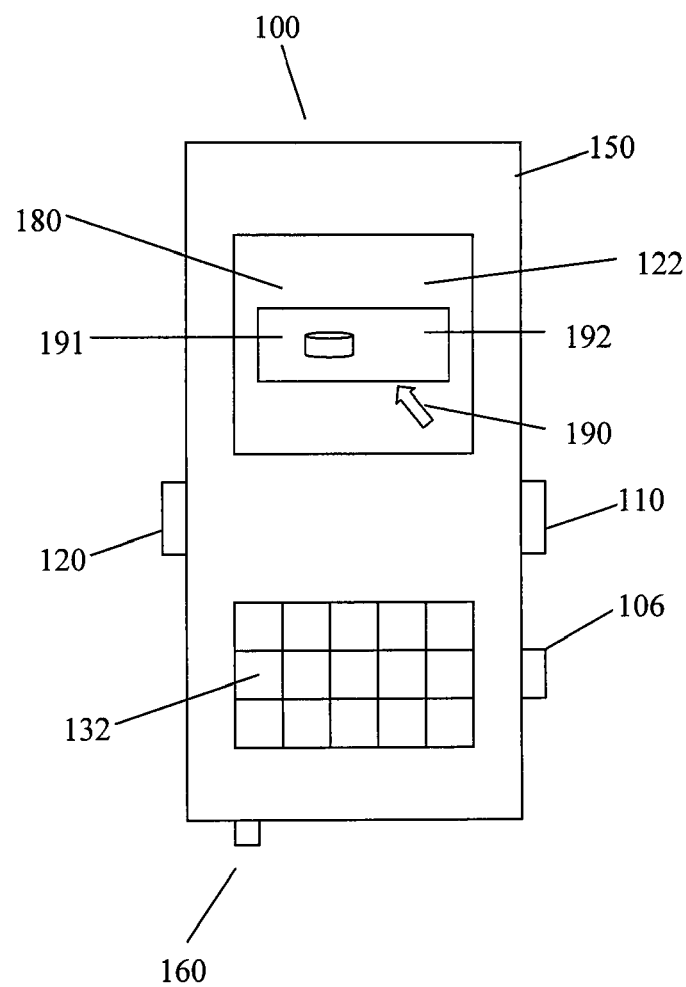
FIG. 1 is a front view illustrating a wireless device adapted for implementing an example embodiment of the application.

FIG. 1 is a front view illustrating a wireless device 100 adapted for implementing an example embodiment of the application. The wireless device 100 includes a casing 150, a display screen 122, a graphical user interface ("GUI") 180 displayed on the display screen 122, a keyboard (or keypad) 132, a trackball (or thumbwheel) 110, various select buttons 120, various inputs/outputs (e.g., power connector jack, data interface ports, etc.) 160, and a headphones jack 106. Internally, the wireless device 100 includes one or more circuit boards (not shown), a central processing unit ("CPU") or microprocessor 138, memory 124, 126, 200, a battery 156, an antenna (not shown), etc., which are operatively coupled to the various inputs/outputs 160, the keyboard 132, the display screen 122, the headphones jack 106, etc., as will be described below.

Figure 2:
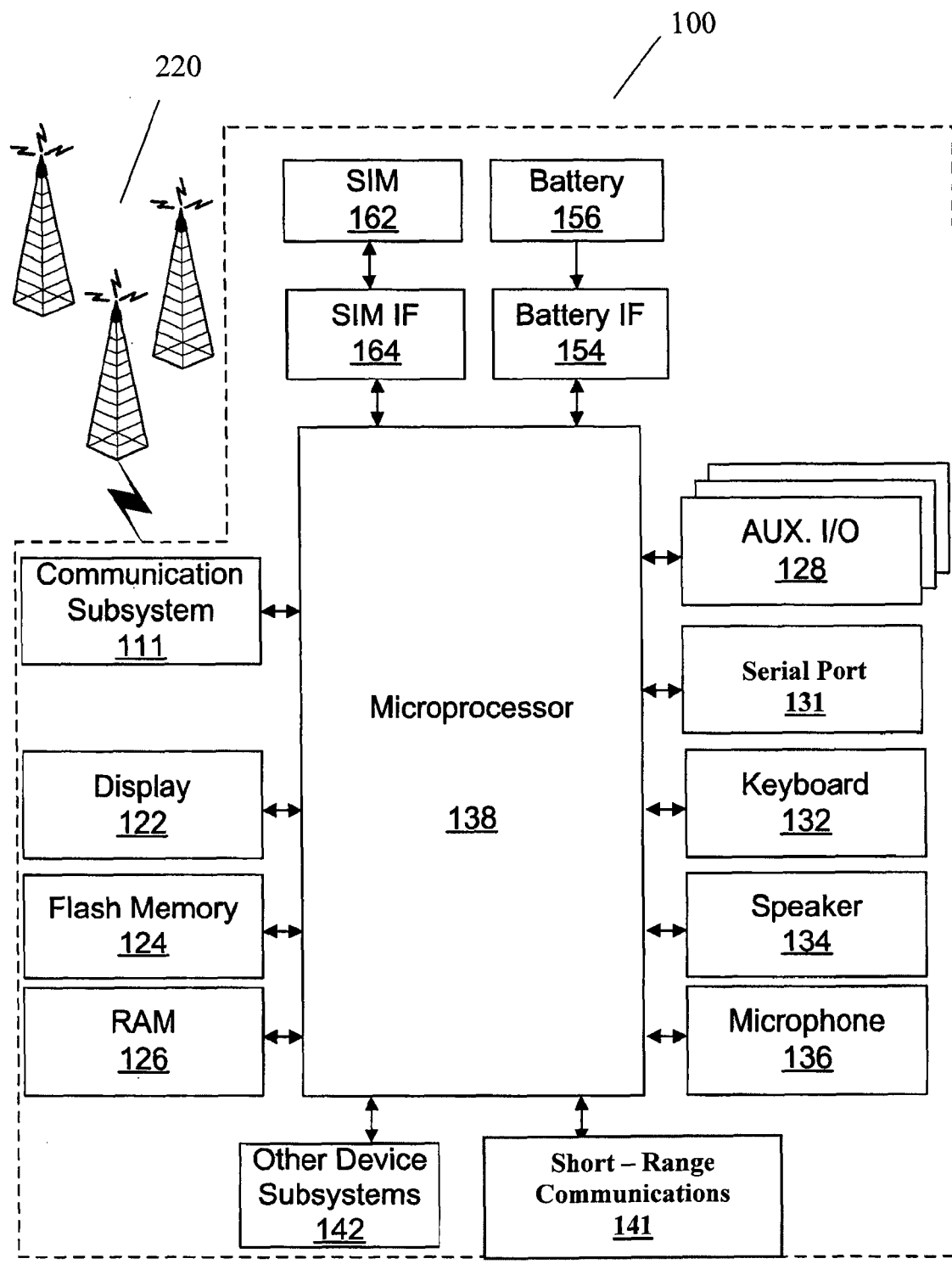
FIG. 2 is a block diagram illustrating the wireless device of FIG. 1 and a wireless network adapted for implementing an example embodiment of the application.

FIG. 2 is a block diagram illustrating the wireless device 100 of FIG. 1 and a wireless network 220 adapted for implementing an example embodiment of the application. The wireless network 220 may include antenna, base stations, access points, transceivers, supporting radio equipment, etc., as known to those of ordinary skill in the art, for supporting wireless communications between the wireless device 100 and other devices (not shown).

The wireless device 100 may be a two-way communication device having at least voice and advanced data communication capabilities, including the capability to communicate with other devices. Depending on the functionality provided by the device 100, it may be referred to as a data messaging device, a two-way pager, a cellular telephone with data messaging capabilities, a wireless Internet appliance, a data communication device (with or without telephony capabilities), a Wi-Fi device, a WLAN device, a dual-mode (i.e., Wi-Fi and cellular) device, or a portable audio device.

The wireless device 100 has a communication subsystem 111, which includes a RF receiver, a RF transmitter, and associated components. As will be apparent to those skilled in the field of communications, the particular design of the communication subsystem 111 depends on the communication network 220 in which the device 100 is intended to operate.

The device 100 may be capable of cellular network access and hence the device 100 may have a subscriber identity module (or "SIM" card) 162 for inserting into a SIM interface ("IF") 164 in order to operate on the cellular network (e.g., a global system for mobile communication ("GSM") network).

The device 100 may be a battery-powered device and so it may also include a battery IF 154 for receiving one or more rechargeable batteries 156. The battery (or batteries) 156 provides electrical power to most if not all electrical circuitry in the device 100, and the battery IF 154 provides for a mechanical and electrical connection for it.

The wireless device 100 includes a microprocessor 138 which controls overall operation of the device 100. The microprocessor 138 interacts with device subsystems such as the display 122, a flash memory 124 or other persistent store, a random access memory ("RAM") 126, auxiliary input/output ("I/O") subsystems 128, a serial port (e.g., a universal serial bus ("USB") port) 131, the keyboard 132, the trackball or thumbwheel 110, headphones via the headphones jack 106, an internal speaker 134, a microphone 136, a short-range communications subsystem 141, and other device subsystems 142. The microprocessor 138, in addition to performing operating system functions, preferably enables execution of software applications on the device 100.

Figure 3:
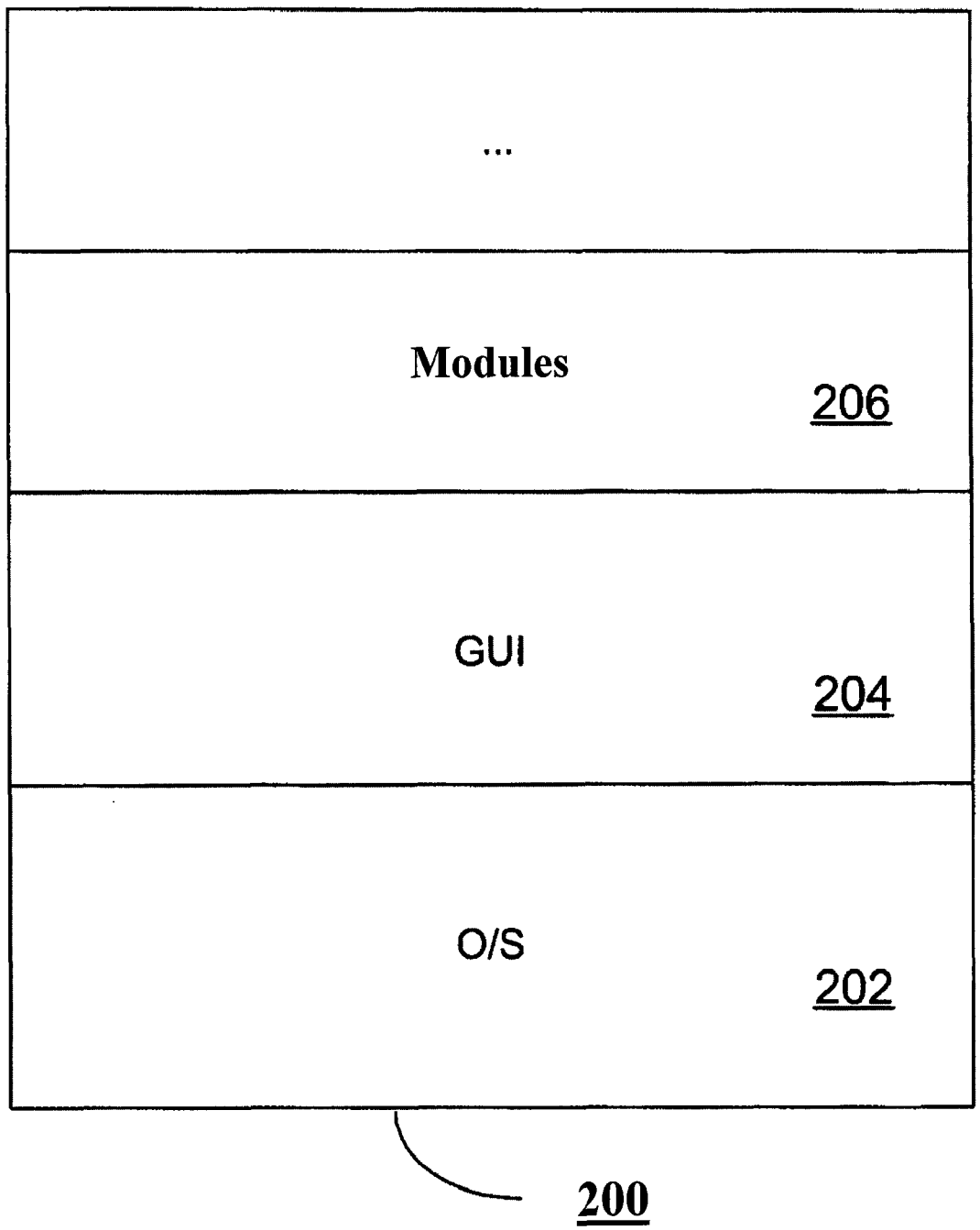
FIG. 3 is a block diagram illustrating a memory of the wireless device of FIGS. 1 and 2.

FIG. 3 is a block diagram illustrating a memory 200 of the wireless device 100 of FIGS. 1 and 2. The microprocessor 138 is coupled to the memory 200. The memory 200 has various hardware and software components for storing information (e.g., instructions, data, database tables, test parameters, etc.) for enabling operation of the device 100 and may include flash memory 124, RAM 126, ROM (not shown), disk drives (not shown), etc. In general, the memory 200 may include a variety of storage devices typically arranged in a hierarchy of storage as understood to those skilled in the art.

operating system ("O/S") software modules 202 used by the microprocessor 138 may be stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

To provide a user-friendly environment to control the operation of the device 100, operating system ("O/S") software modules 202 resident on the device 100 provide a basic set of operations for supporting various applications typically operable through the GUI 180 and supporting GUI software modules 204. For example, the O/S 202 provides basic input/output system features to obtain input from the auxiliary I/O 128, the keyboard 132, the trackball or thumbwheel 110, and the like, and for facilitating output to the user through the display 122, the speaker 134, headphones via the headphones jack 106, etc. According to one example embodiment, the wireless device 100 is provided with hardware and/or software modules 206 for facilitating and implementing the method of the application as will be described below.

A user may interact with the wireless device 100 and its various software modules 202, 204, 206, using the GUI 180. GUIs are supported by common operating systems and provide a display format which enables a user to choose commands, execute application programs, manage computer files, and perform other functions by selecting pictorial representations known as icons, or items from a menu through use of an input or pointing device such as a trackball or thumbwheel 110 and keyboard 132. The GUI 180 may include a cursor 190, various selectable objects and icons 191, and various windows 192.

In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 122 by using an input or pointing device (e.g., trackball or thumbwheel) 110 to position a pointer or cursor 190 over an object (e.g., an icon) 191 and by "clicking" on the object 191.

Typically, a GUI based system presents application, system status, and other information to the user in "windows" appearing on the display 122. A window 192 is a more or less rectangular area within the display 122 in which a user may view an application or a document. Such a window 192 may be open, closed, displayed full screen, reduced to an icon, increased or reduced in size, or moved to different areas of the display 122. Multiple windows may be displayed simultaneously, such as: windows included within other windows, windows overlapping other windows, or windows tiled within the display area.

Thus, the wireless device 100 includes computer executable programmed instructions for directing the device 100 to implement the example embodiments of the present application. The programmed instructions may be embodied in one or more hardware or software modules 206 which may be resident in the memory 200 of the wireless device 100. Alternatively, the programmed instructions may be embodied on a computer readable medium (such as a CD disk or floppy disk) which may be used for transporting the programmed instructions to the memory of the wireless device 100. Alternatively, the programmed instructions may be embedded in a computer-readable signal or signal-bearing medium that may be uploaded to a network 220 by a vendor or supplier of the programmed instructions, and this signal or signal-bearing medium may be downloaded through an interface 111, 131, 141 to the wireless device 100 from the network 220 by end users or potential buyers.

Figure 4:
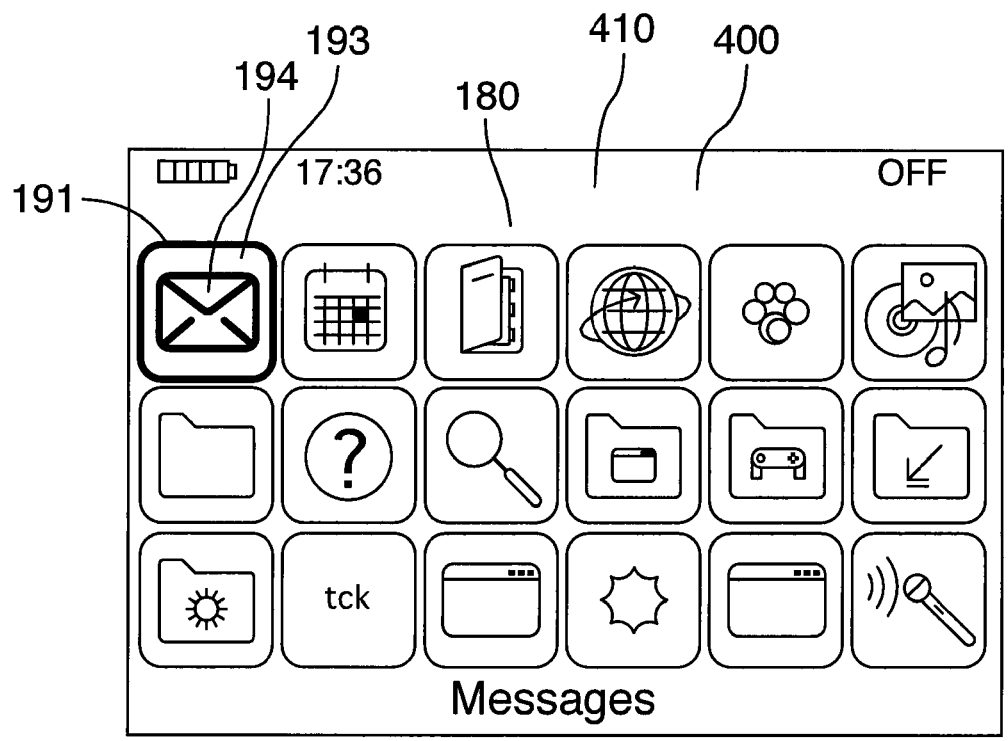
FIG. 4 is a screen capture illustrating a home screen (or window) of a graphical user interface ("GUI") for a wireless device according to an example embodiment of the application.

FIG. 4 is a screen capture illustrating a home screen (or window) 400 of a graphical user interface ("GUI") 180 for a wireless device 100 according to an example embodiment of the application. The GUI 180 may be displayed, for example, on the display screen 122 of the wireless device 100. The home screen 400 includes a 3×6 (i.e., 3 high by 6 wide or 3 rows by 6 columns) arrangement 410 of icons 191. This arrangement 410 may be considered as the default (or current) icon arrangement (or grid layout) for the home screen 400. Each icon 191 has a size (e.g., A×B pixels). In addition, each icon 191 may have associated therewith an underlay 193 and/or an overlay 194. The underlay 193 and overlay may have respective sizes (e.g., A+1×B+1 pixels and A−5×B−5 pixels, respectively). The underlay 193 may be presented under the icon 191 when the icon 191 is selected (e.g., pointed at with the cursor 190 or via the pointing device 110). Similarly, the overlay 194 may be presented over the icon 191 when the icon 191 is selected. The underlay 193 and overlay 194 may be used as a visual cue to indicate that the icon 191 has been selected. In FIG. 4, for example, the icon 191 is an envelope indicating an email application. The underlay 193 is a highlighted border around the envelope and the overlay 194 is highlighted version of the envelope. In addition, the overlay 194 may be presented over the icon 191 to indicate the status of the application associated with the icon 191. For an email application associated with the icon 191, for example, the overlay 194 may indicate that new email has been received. Each icon 191 may have more than one associated underlay 193 or overlay 194.

Figure 5:
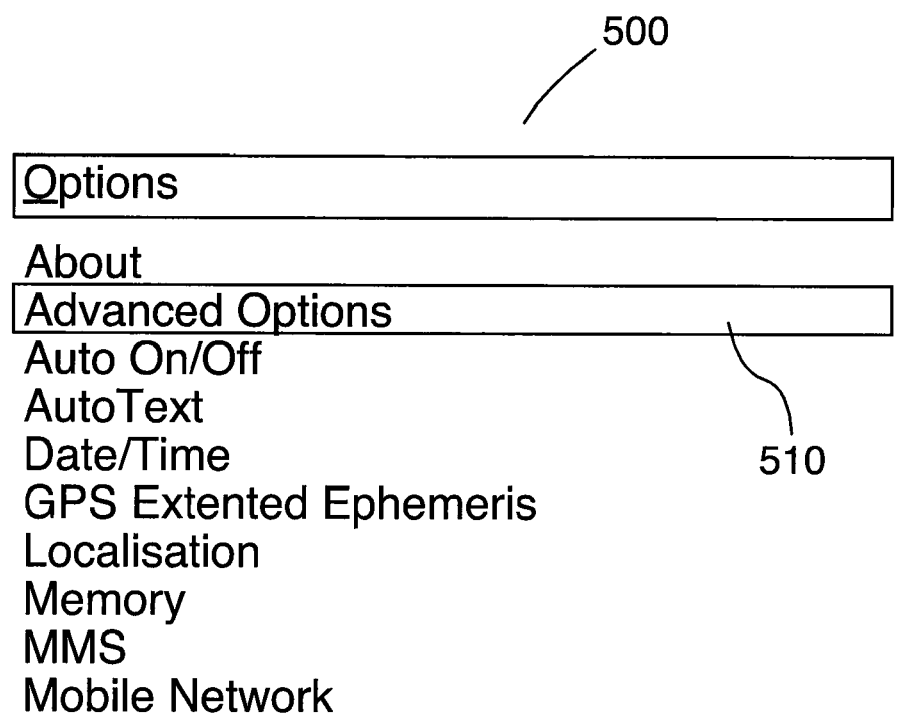
FIG. 5 is a screen capture illustrating an Options menu for the wireless device according to an example embodiment of the application.

FIG. 5 is a screen capture illustrating an Options menu 500 for the wireless device 100 according to an example embodiment of the application. The "Options" menu 500 includes a number of selectable items or choices for configuring various operational parameters for the wireless device 100 and may be presented on the display screen 122 of the wireless device 100 as part of the GUI 180. The "Advanced Options" menu item 510 allows a user to initiate operations for configuring various advanced operational parameters for the wireless device 100. Upon selecting the Advanced Options menu item 510, an "Advanced Options" menu may be presented on the display screen 122.

Figure 6:
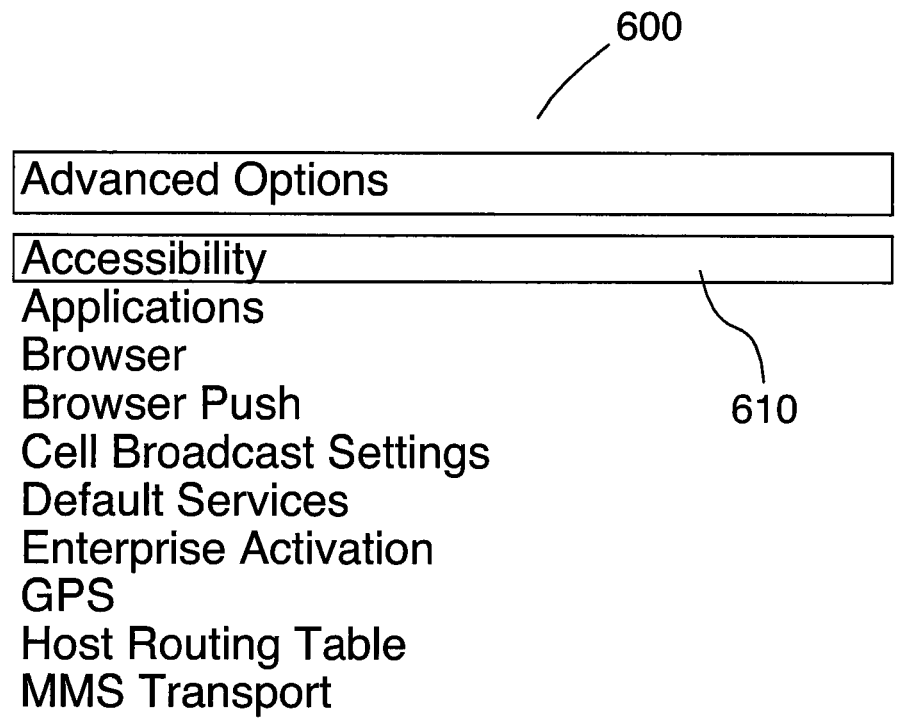
FIG. 6 is a screen capture illustrating an Advanced Options menu for the wireless device according to an example embodiment of the application.

FIG. 6 is a screen capture illustrating an Advanced Options menu 600 for the wireless device 100 according to an example embodiment of the application. The "Advanced Options" menu 600 includes a number of selectable items or choices for configuring various advanced operational parameters for the wireless device 100 and may be presented on the display screen 122 of the wireless device 100 as part of the GUI 180. The "Accessibility" menu item 610 allows a user to configure various parameters relating to the visibility of the home screen 400. Upon selecting the Accessibility menu item 610, an "Accessibility" menu may be presented on the display screen 122.

Figure 7:
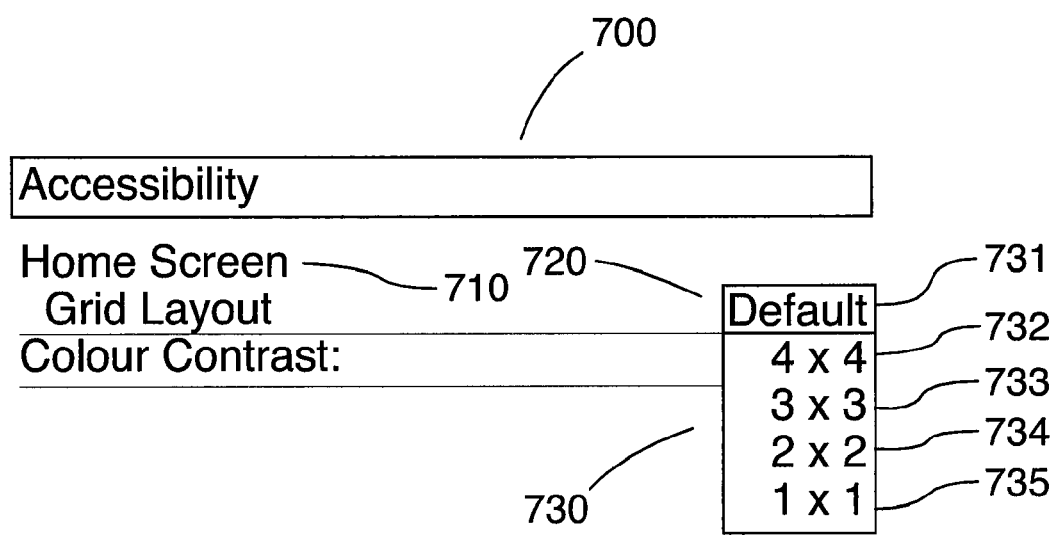
FIG. 7 is a screen capture illustrating an Accessibility menu for the wireless device according to an example embodiment of the application.

FIG. 7 is a screen capture illustrating an Accessibility menu 700 for the wireless device 100 according to an example embodiment of the application. The "Accessibility" menu 700 includes a number of selectable items or choices for configuring various parameters relating to the visibility of the home screen 400 and may be presented on the display screen 122 of the wireless device 100 as part of the GUI 180. The "Home Screen Grid Layout" menu item 710 allows a user to initiate operations for selecting the arrangement of icons 191 to be presented on the home screen 400. Upon selecting the Home Screen Grid Layout" menu item 710, a Grid Layout pop-up menu window 720 may be presented on the display screen 122.

The Grid Layout pop-up menu window 720 may be displayed over a portion of the Accessibility menu 700. The Grid Layout pop-up window 720 allows the user to select an arrangement of icons 191 to be presented on the display screen 122 for the home screen 400 as part of the GUI 180. The Grid Layout pop-up menu 720 presents the user with a list 730 of menu items or choices 731-735 for configuring the arrangement of icons 191 to be presented on the home screen 400.

Figure 8:
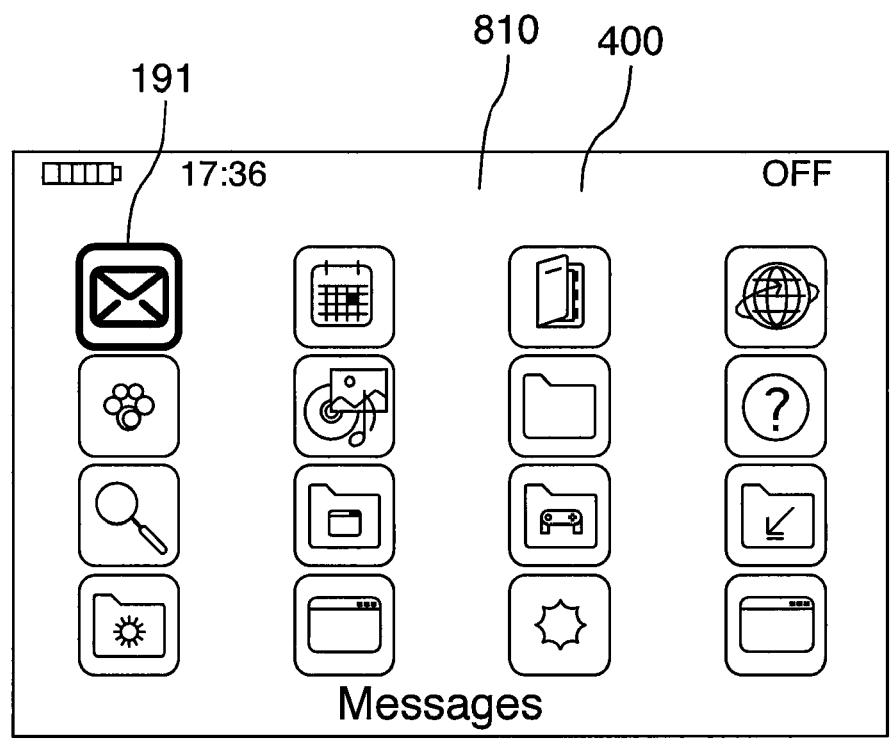
FIG. 8 is a screen capture illustrating a home screen (or window) having a 4×4 arrangement of icons according to an example embodiment of the application.
Figure 9:
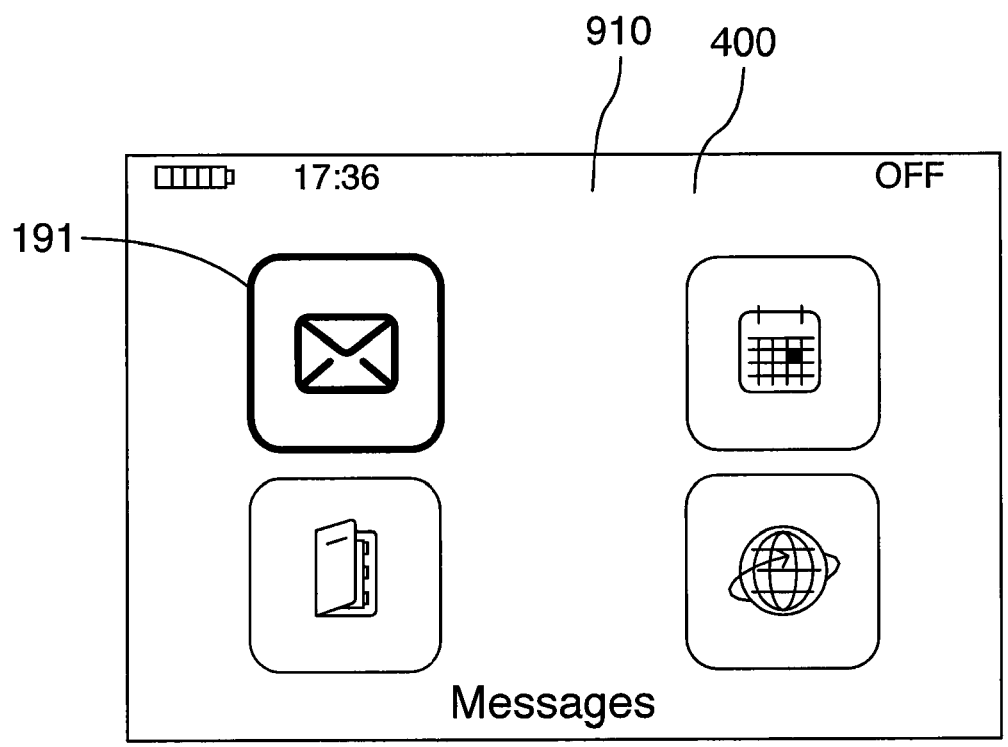
FIG. 9 is a screen capture illustrating a home screen (or window) having a 2×2 arrangement of icons according to an example embodiment of the application; and, FIG. 10 is a flow chart illustrating operations of modules within the memory of a device for displaying icons of a graphical user interface on the display screen of the device, in accordance with an example embodiment of the application.

If the user selects the "Default" menu item 731, then the default (or current) 3×6 arrangement 410 of icons 191 (i.e., 18 icons) shown in FIG. 4 will be presented on the home screen 400. If the user selects the "4×4" menu item 732, then a 4×4 arrangement 810 of icons 191 (i.e., 16 icons) as shown in FIG. 8 will be presented on the home screen 400. If the user selects the "3×3" menu item 733, then a 3×3 arrangement of icons 191 (i.e., 9 icons) will be presented on the home screen 400. If the user selects the "2×2× menu item 734, then a 2×2 arrangement 910 of icons 191 (i.e., 4 icons) as shown in FIG. 9 will be presented on the home screen 400. And, if the user selects the "1×1" menu item 735, then a 1×1 arrangement of icons 191 (i.e., 1 icon) will be presented on the home screen 400. Of course the selection of the arrangements listed in the Grid Layout pop-up menu 720 may be varied (e.g., 1×6, 4×2, etc.).

According to one example embodiment, the user may input a custom or user defined arrangement of icons (e.g., number of rows and number of columns) into a dialog box (not shown) presented over the Accessibility menu 700 or elsewhere. According to another example embodiment, the user may input a number of icons to be displayed and an appropriate arrangement of icons will be determined by modules 206 within the wireless device 100, accordingly. For example, the number of icons entered by the user may be 4. In response, modules 206 within the wireless device 100 may determine that a 2×2 arrangement 910 of icons 191 is appropriate.

According to one example embodiment, the home screen 400 may be any screen or window (e.g., subfolder screen, sub-window, etc.) that is presented on the display screen 122 and includes one or more icons 191.

According to one example embodiment, the user may alter the current (e.g., default) arrangement of icons (e.g., 410) based on the following: a number of icons (i.e., rows and columns) to be displayed; a number of icons remaining; and, a user selected number of icons to be displayed.

According to one example embodiment, the user may change the arrangement of icons (or grid layout) (e.g., 410) dynamically. The user may select the number of icons 191 to be displayed at a time on the display screen 122. For example, the user may select from among the following exemplary arrangements of icons: 2×2 (4 icons); 2×3 (6 icons); 3×3 (9 icons); and, 4×4 (16 icons).

According to one example embodiment, when the number of icons 191 to be displayed is reduced, the icons 191 remain at their previous size (e.g., A×B pixels) in the new arrangement of icons (e.g., 910). That is, the icons 191 are not "resized" to a larger size. However, the underlay 193 or overlay 194 that is used to identify which icon 191 is currently selected is adjusted in size (i.e., is enlarged as the grid spacing expands) to improve visibility. For example, an underlay 193 for an icon 191 having a current size of say A+1×B+1 pixels in a current (e.g., default) arrangement of icons (e.g., 410) may be increased to A+5×B+5 pixels in an arrangement of icons 910 that includes fewer icons 191. Similarly, for example, an overlay 194 for an icon 191 having an current size of say A−5×B−5 pixels in a current (e.g., default) arrangement of icons (e.g., 410) may be increased to A−2× B−2 pixels in an arrangement of icons 910 that includes fewer icons 191.

According to one example embodiment, if the arrangement of icons selected contains more icons than the current (e.g., default) arrangement of icons (e.g., 410), then the icons 191 may be reduced in scale to fit within the tighter spacing between icons.

According to one example embodiment, icon spacing is dynamically adjustable and settable according to the number of rows and columns of icons to be displayed on the display screen 122.

According to one example embodiment, the spacing between icons 191 is determined as follows. If, for example, a 480×240 pixel region is allocated for displaying icons 191 and a 2×2 arrangement 910 of icons 191 has been selected, then the 480×240 pixel region may be divide into four 240× 120 pixel icon regions. The underlay 193 for each icon 191 may then be scaled to fit within its corresponding 240×120 pixel icon region. If the icon region is smaller than the current (or default) icon size, then the icon may be scaled down so that it fits within the icon region. If the icon region is larger than the current (or default) icon size, then the icon 191 is not scaled (i.e., only its underlay 193 is scaled upwards). Rather, the icon 191 is centred within the icon region.

The application is useful. For example, methods disclosed herein allow for improved visibility of icons 191 presented on the display screens 122 of wireless devices 100. In addition, the usability of the display screen 122 and wireless device 100 by persons having impaired vision is improved by limiting the number of icons, improving the spacing between icons, and allowing the user to select larger sized icon underlays 193 and/or overlays 194. Furthermore, the icon arrangement choices 731-735 are intuitive as they refer to a number of rows and columns of icons. Moreover, by enlarging selection underlays 193 and/or overlays 194 with increasing grid spacing, the selected icon 191 is easier to identify. Text is not compressed as is sometimes the case in certain icon displays when icon sizes are adjusted. As such, wireless device 100 usability is improved for users with impaired vision, leaning disabilities, memory loss, or cognitive impairments.

Figure 10:
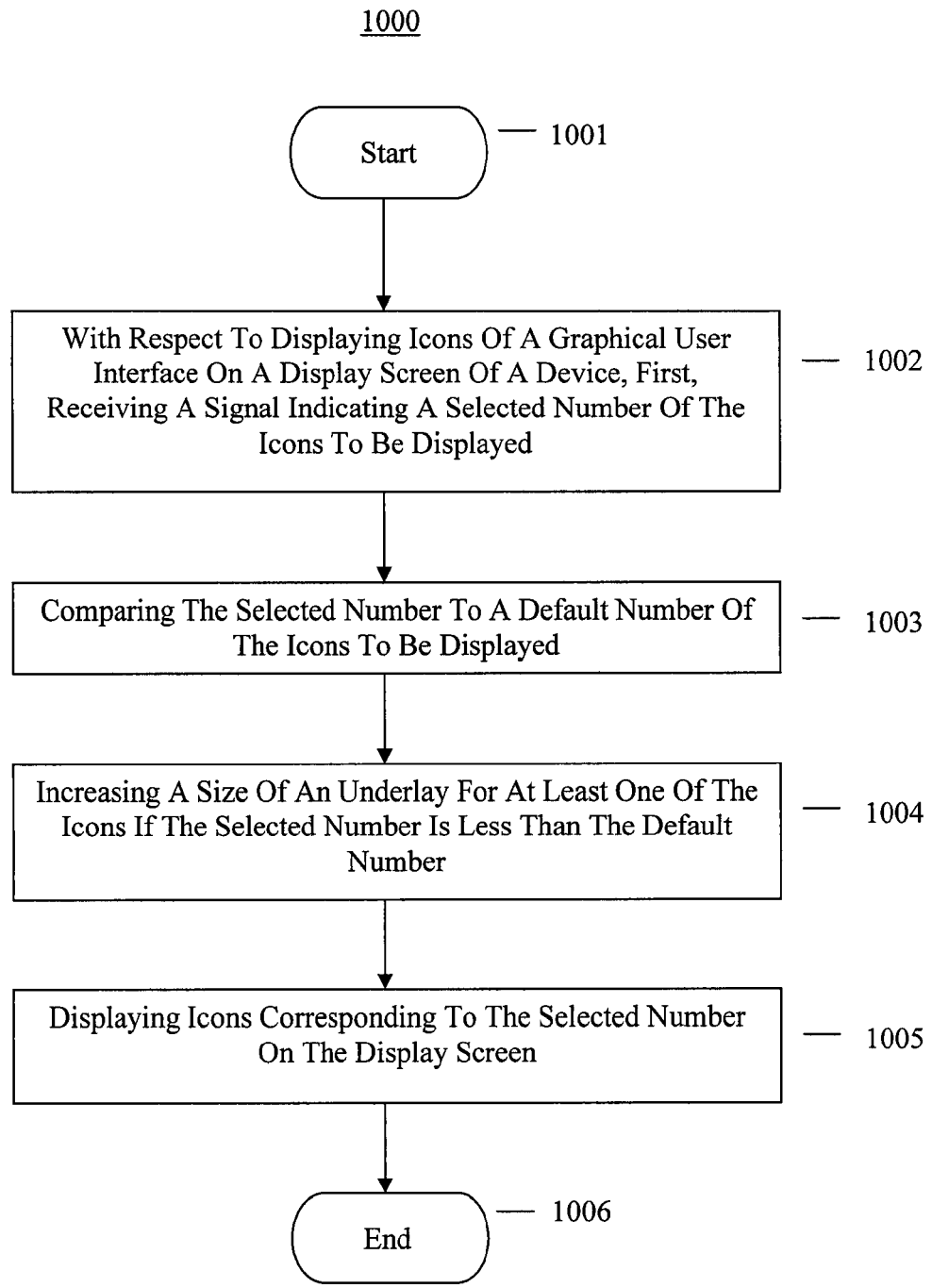

Aspects of the above described method may be illustrated with the aid of a flowchart. FIG. 10 is a flow chart illustrating operations 1000 of modules 206 within the memory 200 of a device 100 for displaying icons of a graphical user interface on the display screen of the device 100, in accordance with an example embodiment of the application.

At step 1001, the operations 1000 start.

At step 1002, a signal is received (e.g., via the Grid Layout pop-up menu window 720) indicating a selected number (e.g., 2×2=4) of the icons 191 to be displayed.

At step 1003, the selected number is compared to a current number (e.g., 3×6=18) of the icons 191 to be displayed.

At step 1004, a size of an underlay 193 for at least one of the icons 191 is changed (e.g., increased) if the selected number is not equal to the current number.

At step 1005, icons 191 corresponding to the selected number are displayed on the display screen 122.

At step 1006, the operations 1000 end.

The above method may further include changing a spacing between icons 191 if the selected number is not equal to the current number. The device 100 may be a wireless device 100. The current number (e.g., 18) may have a corresponding current arrangement of icons (e.g., 410). The selected number (e.g., 4) may have a corresponding selected arrangement of icons (e.g., 910). The signal may indicate a selected arrangement of icons (e.g., 734). The selected arrangement of icons 910 may be an even-sided (e.g., 4×4, 3×3, 2×2, or 1×1) arrangement of icons. The method may further include increasing a size of an overlay 194 for at least one of the icons 191 if the selected number is not equal to the current number. The size of the icons 191 may remain constant if the selected number is less than the current number. And, the icons 191 may be displayed on a home screen 400 of the graphical user interface 180.

The above described method is generally performed by a wireless device 100. However, according to one example embodiment, the method can be performed by any other data processing system 100 such as a personal computer ("PC"), server, laptop computer, etc.

While example embodiments of this application are primarily discussed as a method, a person of ordinary skill in the art will understand that the apparatus discussed above with reference to a wireless device 100 and a data processing system, may be programmed to enable the practice of the method of these example embodiments. Moreover, an article of manufacture for use with a wireless device 100 or data processing system, such as a pre-recorded storage device or other similar computer readable medium including program instructions recorded thereon, may direct the wireless device 100 or data processing system to facilitate the practice of the method of these example embodiments. It is understood that such apparatus and articles of manufacture also come within the scope of the application.

The example embodiments of the application described above are intended to be exemplary only. Those skilled in this art will understand that various modifications of detail may be made to these example embodiments, all of which come within the scope of the application.

What is claimed is:

1. A method for displaying icons of a graphical user interface ("GUI") on a display screen of a device, comprising:
   receiving a signal indicating a selected number of the icons to be displayed in the GUI;
   comparing the selected number to a current number of the icons to be displayed;
   when the selected number is not equal to the current number
      changing a size of an underlay for an icon of the icons for presentation in the GUI when the icon is selected in the GUI; and
      changing a size of an overly of the icon independently of the size of the underlay for presentation in the GUI when the icon is selected in the GUI; and,
   displaying the icons in the GUI corresponding to the selected number on the display screen.

2. The method of claim 1 and further comprising when the selected number is not equal to the current number changing a spacing between two icons displayed in the GUI if the selected number is not equal to the current number.

3. The method of claim 1 wherein;
   the current number has a corresponding current arrangement of icons; and
   the selected number has a corresponding selected arrangement of icons.

4. The method of claim 3 wherein the signal indicates a selected arrangement of icons.

5. The method of claim 4 wherein the selected arrangement of icons is an even-sided arrangement of icons.

6. The method of claim 1 and further comprising changing a size of an overlay for at least one of the icons if the selected number is not equal to the current number.

7. The method of claim 1 wherein the size of the icons remains constant if the selected number is less than the current number.

8. The method of claim 1 wherein the icons are displayed on a home screen of the GUI.

9. The method of claim 1 wherein:
   the icon is for an email application;
   the underlay is a highlighted border around the icon; and
   the overlay is a highlighted envelope.

10. The method of claim 1 wherein when the selected number is less than the current number
    the size of the icon is not changed; and
    the size of the underlay or the overlay is enlarged.

11. A system for displaying icons of a graphical user interface ("GUI") on a display screen, comprising:

a processor coupled to memory and the display screen; and,
modules within the memory and executed by the processor, the modules including:
- a module for receiving a signal indicating a selected number of the icons to be displayed;
- a module for comparing the selected number to a current number of the icons to be displayed;
- a module for changing a size of an underlay for an icon of the icons for presentation in the GUI when the icon is selected in the GUI;
- a module for changing a size of an overly of the icon independently of the size of the underlay for presentation in the GUI when the icon is selected in the GUI; and,
- a module for displaying the icons in the GUI corresponding to the selected number on the display screen.

12. The system of claim 11 and further comprising a module for changing a spacing between icons if the selected number is not equal to the current number.

13. The system of claim 11 wherein:
the current number has a corresponding current arrangement of icons; and
the selected number has a corresponding selected arrangement of icons.

14. The system of claim 13 wherein the signal indicates a selected arrangement of icons.

15. The system of claim 14 wherein the selected arrangement of icons is an even-sided arrangement of icons.

16. The system of claim 11 and further comprising changing a size of an overlay for at least one of the icons if the selected number is not equal to the current number.

17. The system of claim 11 wherein the size of the icons remains constant if the selected number is less than the current number.

18. The system of claim 11 wherein the icons are displayed on a home screen of the GUI.

19. The system of claim 11 wherein:
the icon is for an email application;
the underlay is a highlighted border around the icon; and
the overlay is a highlighted envelope.

20. The system of claim 11 wherein when the selected number is less than the current number,
the module for changing the size of the underlay for the icon does not change the size of the icon; and
the module for changing the size of the overlay enlarges the size of the overlay.

* * * * *